(12) United States Patent
Maezawa (10) Patent No.: US 12,367,854 B2
(45) Date of Patent: Jul. 22, 2025

(54) PERFORMANCE AGENT TRAINING METHOD, AUTOMATIC PERFORMANCE SYSTEM, AND PROGRAM

(71) Applicant: Yamaha Corporation, Shizuoka (JP)

(72) Inventor: Akira Maezawa, Shizuoka (JP)

(73) Assignee: Yamaha Corporation, Shizuoka (JP)

( * ) Notice: Subject to any disclaimer, the term of this patent is extended or adjusted under 35 U.S.C. 154(b) by 326 days.

(21) Appl. No.: 17/950,804

(22) Filed: Sep. 22, 2022

(65) Prior Publication Data

US 2023/0014736 A1 Jan. 19, 2023

Related U.S. Application Data (63) Continuation of application No. PCT/JP2021/009361, filed on Mar. 9, 2021.

(30) Foreign Application Priority Data

Mar. 23, 2020 (JP) .................. 2020-051490

(51) Int. Cl.
G10H 1/00 (2006.01)
G06V 40/16 (2022.01)
G06V 40/20 (2022.01)
G10H 1/36 (2006.01)

(52) U.S. Cl.
CPC ......... *G10H 1/0008* (2013.01); *G06V 40/174* (2022.01); *G06V 40/23* (2022.01); *G10H 1/361* (2013.01); *G10H 2210/091* (2013.01)

(58) Field of Classification Search
CPC ....... G10H 1/008; G06V 40/23; G06V 40/174
See application file for complete search history.

(56) References Cited

U.S. PATENT DOCUMENTS

| 11,461,952 B1* | 10/2022 | Bosnak .................. G06F 40/30 |
| 11,600,252 B2* | 3/2023 | Maezawa ............... G06N 3/047 |
| 2010/0018382 A1* | 1/2010 | Feeney ................ G10H 1/0025 |
| | | 84/615 |
| 2019/0237055 A1 | 8/2019 | Maezawa |
| 2022/0313083 A1* | 10/2022 | Zakariaie ............... G16H 10/20 |
| 2023/0014315 A1* | 1/2023 | Maezawa ............. G10H 1/0008 |

FOREIGN PATENT DOCUMENTS

| CN | 105390130 B | * | 6/2019 | .......... G10H 1/0025 |
| KR | 2005036469 A | * | 4/2005 | |
| WO | 2018070286 A1 | | 4/2018 | |

OTHER PUBLICATIONS

International Search Report in PCT/JP2021/009361, dated May 25, 2021.

* cited by examiner

*Primary Examiner* — Robert W Horn
(74) *Attorney, Agent, or Firm* — Global IP Counselors LLP (57) ABSTRACT

A performance agent training method realized by at least one computer includes observing a first performance of a musical piece by a performer, generating, by a performance agent, performance data of a second performance to be performed in parallel with the first performance, outputting the performance data such that the second performance is performed in parallel with the first performance of the performer, acquiring a degree of satisfaction of the performer with respect to the second performance performed based on the output performance data, and training the performance agent by reinforcement learning, using the degree of satisfaction as a reward.

19 Claims, 7 Drawing Sheets

PERFORMANCE AGENT TRAINING METHOD, AUTOMATIC PERFORMANCE SYSTEM, AND PROGRAM

CROSS-REFERENCE TO RELATED APPLICATIONS

This application is a continuation application of International Application No. PCT/JP2021/009361, filed on Mar. 9, 2021, which claims priority to Japanese Patent Application No. 2020-051490 filed in Japan on Mar. 23, 2020. The entire disclosures of International Application No. PCT/JP2021/009361 and Japanese Patent Application No. 2020-051490 are hereby incorporated herein by reference.

BACKGROUND

Technological Field

This disclosure relates to a performance agent training method, an automatic performance system, and a program.

Background Information

In recent years there has been progress in the development of performance agents that automatically perform musical performances in accordance with the performance of a performer. For example, International Publication No. 2018/070286 proposes a technology for the automatic performance of a musical piece that is synchronized with the progression of the performance by a presumed performer. In the technology of International Publication No. 2018/070286, it is proposed that a configuration be used in which the automatic performance is controlled in accordance with cueing motions of a specific performer, and in which an estimation model that has been trained by machine learning to identify the cueing motion is used.

SUMMARY

For example, because the various attributes related to the performer's performance, such as performance ability and the musical instrument that is played, vary, a performance agent suitable for one performer may not necessarily be suitable for another performer. If a performance agent is manually generated for each performer, the cost of generating performance agents would be extremely high.

This disclosure is made in light of the above-mentioned circumstances, and an object of one aspect of this disclosure is to provide a technology for reducing the cost of generating a performance agent that is compatible with a performer.

In order to achieve the above-mentioned object, a performance agent training method realized by at least one computer according to one aspect of this disclosure comprises observing a first performance of a musical piece by a performer, generating, by a performance agent, performance data of a second performance to be performed in parallel with the first performance, outputting the performance data such that the second performance is performed in parallel with the first performance of the performer, acquiring a degree of satisfaction of the performer with respect to the second performance performed based on the output performance data, and training the performance agent, by reinforcement learning, using the degree of satisfaction as a reward.

DETAILED DESCRIPTION OF THE EMBODIMENTS

An embodiment of this disclosure will be described in detail below with reference to the appended drawings. The embodiments described below are merely examples of configurations that can realize this disclosure. Each of the embodiments described below can be appropriately revised or modified in accordance with various conditions and the configuration of the device to which this disclosure is applied. Further, not all combinations of the elements included in the following embodiments are essential for realizing this disclosure, and some of the elements can be omitted as deemed appropriate. Accordingly, the scope of this disclosure is not limited by the configurations described in the following embodiments. Further, configurations combining a plurality of configurations described in the embodiment can also be employed as long as they do not contradict each other.

1. Application Example

Figure 1:
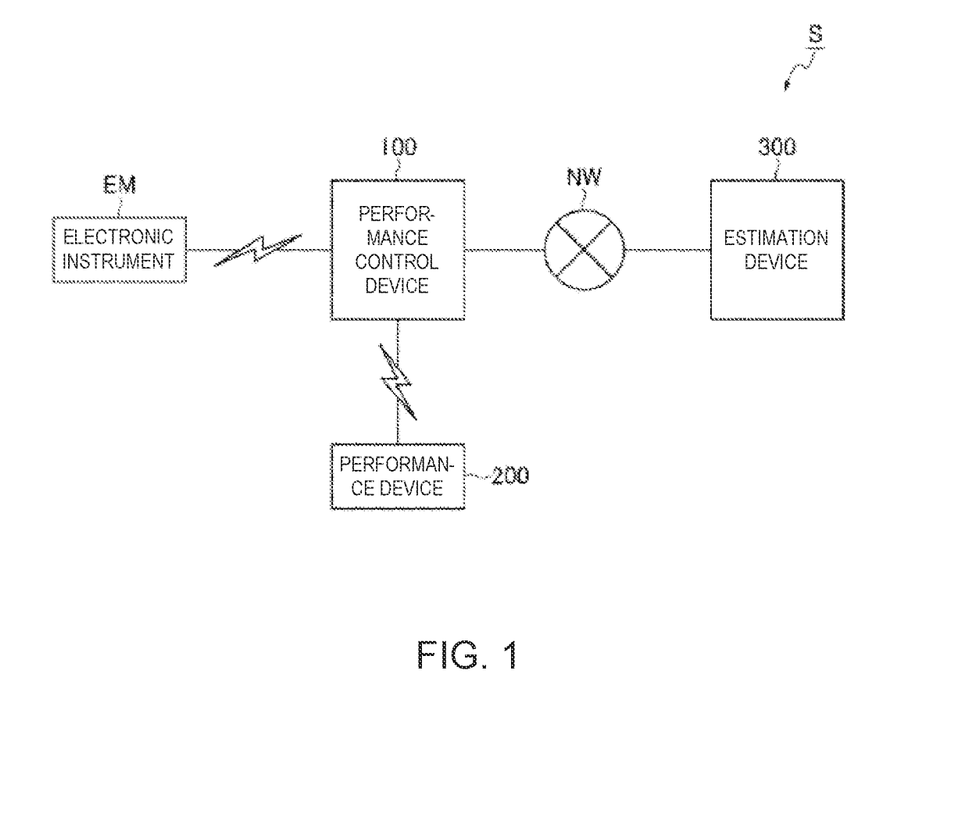
FIG. 1 shows an example of the configuration of an automatic performance system according to an embodiment.

FIG. 1 shows an example of the configuration of an automatic performance system S according to an embodiment. As shown in FIG. 1, the automatic performance system S of the embodiment includes a performance control device 100, a performance device 200, and an estimation device 300. The performance control device 100 and the estimation device 300 are realized by an information processing device (computer), such as a personal computer, a server, a tablet terminal, or a mobile terminal (such as a smartphone).

The performance control device 100 is a computer configured to automatically generate performance data for controlling the performance device 200 and to supply this data to the performance device 200. The performance device 200 can be appropriately configured to perform a second performance in accordance with the performance data of a second performance. In one example, the performance device 200 is a performance instrument, in particular, an automatic performance instrument such as a keyboard instrument, and has a sound generating mechanism and a drive mechanism. The performance device 200 is a computer configured to execute an unmanned performance based on the performance data supplied from the performance control device 100. The sound generating mechanism of the performance device 200 is a string-striking mechanism that strikes a string (sounding body) to generate sound in conjunction with the displacement of each key on a keyboard. The drive mechanism of the performance device 200 realizes the performance of the target musical piece by driving the sound generating mechanism based on the performance data described above. The estimation device 300 is a computer that is configured to estimate the degree of satisfaction (favorability rating) of the performer in the collaborative performance of the performer and a performance agent 160. The "degree of satisfaction" in this disclosure means the degree of personal satisfaction of a particular performer.

The performer of this embodiment typically performs using an electronic instrument EM connected to the performance control device 100. The electronic instrument EM of this embodiment can be an electronic keyboard instrument (electronic piano, etc.), an electronic string instrument (electric guitar, etc.), an electronic wind instrument (wind synthesizer, etc.). However, the musical instrument that the performer uses for performance is not limited to the electronic instrument EM. In another example, the performer can perform using an acoustic instrument. In yet another example, the performer according to the embodiment can be a singer of a musical piece who does not use a musical instrument. In this case, the performer's performance can be carried out without using a musical instrument. Hereinbelow, the performer's performance is referred to as the "first performance" and the performance by the performance agent 160 is referred to as the "second performance."

In general, the automatic performance system S according to the embodiment observes the first performance of a musical piece by a performer and generates performance data of the second performance to be performed by the performance agent 160, described further below, in parallel with the observed first performance. Then, the automatic performance system S outputs the performance data so that the second performance is performed in parallel with the first performance by the performer and acquires the performer's degree of satisfaction with the second performance that is based on the output performance data. Then, the automatic performance system S trains the performance agent 160 to maximize the sum of the degrees of satisfaction acquired in the future by reinforcement learning using the acquired degree of satisfaction as a reward. By this automatic performance system S, a performance agent 160 that is compatible with the performer can be automatically generated. As a result, the cost of generating a performance agent 160 that is compatible with the performer can be reduced.

2. Hardware Configuration Examples (Performance Control Device)

Figure 2:
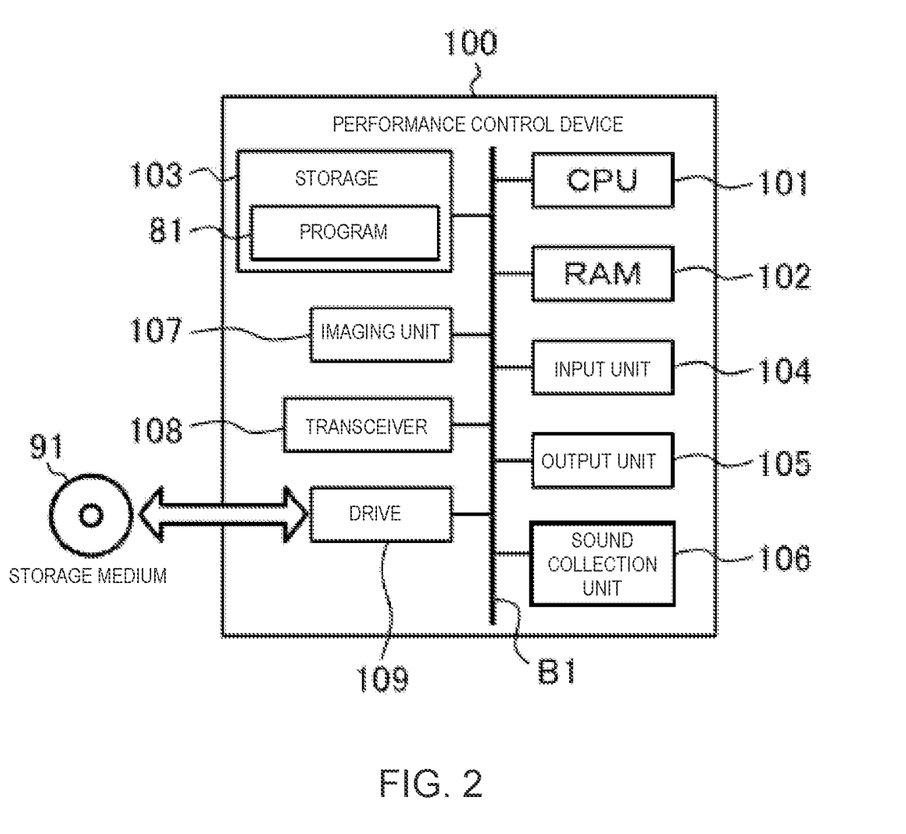
FIG. 2 shows an example of the hardware configuration of a performance control device according to the embodiment.

FIG. 2 shows one example of the hardware configuration of the performance control device 100 according to the embodiment. As shown in FIG. 2, the performance control device 100 is a computer in which a CPU (Central Processing Unit) 101, a RAM (Random Access Memory) 102, a storage 103, an input unit 104, an output unit 105, a sound collection unit 106, an imaging unit 107, a transceiver 108, and a drive 109 are electrically connected via a bus B1.

The CPU 101 includes one or a plurality of processors for executing various computations in the performance control device 100. The CPU 101 is one example of a processor resource. The type of the processor can be selected as appropriate in accordance with the implementation. The performance control device 100 can be configured to comprise, instead of the CPU 101 or in addition to the CPU 101, an SPU (Sound Processing Unit), a DSP (Digital Signal Processor), an FPGA (Field Programmable Gate Array), an ASIC (Application Specific Integrated Circuit), etc. The RAM 102 is a volatile storage medium that operates as a working memory in which various types of information, such as the setting values used by the CPU 101, are stored, and into which various programs are loaded. The storage 103 is a non-volatile storage medium in which various programs and data used by the CPU 101 are stored. The RAM 102 and the storage 103 are examples of memory resources (computer memories) that hold programs that are executed by the processor resource.

In the embodiment, various types of information such as a program 81 are stored in the storage 103. The program 81 is a program for causing the performance control device 100 to execute information processing (FIGS. 6 and 7, described further below) to perform the second performance in parallel with the first performance of a musical piece by a performer, and to train the performance agent 160, described further below. The program 81 includes a series of instructions for the information processing.

The input unit 104 includes an input device (user operable input) for receiving operations for the performance control device 100. The input unit 104 can, for example, include one or a plurality of input devices, such as a keyboard, a mouse, and the like, which are connected to the performance control device 100.

The output unit 105 includes an output device for outputting various types of information. The output unit 105 can include one or a plurality of output devices, such as a display, a speaker, and the like, for example, which are connected to the performance control device 100. The information can be output in the form of video signals, sound signals, or the like, for example.

The input unit 104 and the output unit 105 can be integrally configured by an input/output device, such as a touch panel display that receives user operations on the performance control device 100, and outputs various types of information.

The sound collection unit 106 is configured to convert the collected sound into electronic signals and to supply the electronic signals to the CPU 101. The sound collection unit 106 includes a microphone, for example. The sound collection unit 106 can be built into the performance control device 100, or be connected to the performance control device 100 via an interface, not shown.

The imaging unit 107 is configured to convert captured images into electronic signals and to supply the electronic signals to the CPU 101. The imaging unit 107 includes a digital camera, for example. The imaging unit 107 can be built into the performance control device 100 or connected to the performance control device 100 via an interface, not shown.

The transceiver 108 is configured to transmit data to and receive data from other devices, by wire or wirelessly. In the embodiment, the performance control device 100 can be connected via the transceiver 108 to the performance device 200 to be controlled, the electronic instrument EM that the performer uses to play the musical piece, and the estimation device 300, to transmit and receive data. The transceiver 108 also can include a plurality of modules (for example, a Bluetooth (registered trademark) module, a Wi-Fi (registered trademark) module, a USB (Universal Serial Bus) port, a dedicated port, etc.).

The drive 109 is a drive device for reading various types of information, such as programs stored in the storage medium 91. The storage medium 91 accumulates information, such as programs, by electronic, magnetic, optical, mechanical, or chemical means, so that a computer, and other devices and machines can read the various stored information, such as programs. The storage medium 91 can be, for example, a floppy disk, an optical disc (for example, a compact disk, a digital versatile disk, a Blu-ray disk), a magnetooptical disk, a magnetic tape, a non-volatile memory card (for example, a flash memory), or the like. The type of drive 109 can be arbitrarily selected in accordance with the type of storage medium 91. The program 81 can be stored in the storage medium 91, and the performance control device 100 can read the above-described program 81 from the storage medium 91.

The bus B1 is a signal transmission path that electrically interconnects the above-mentioned hardware components of the performance control device 100. With respect to the specific hardware configuration of the performance control device 100, components can be omitted, replaced, or supplemented as deemed appropriate in accordance with the implementation. For example, at least one or more of the input unit 104, the output unit 105, the sound collection unit 106, the imaging unit 107, the transceiver 108, or the drive 109 can be omitted.

(Estimation Device)

Figure 3:
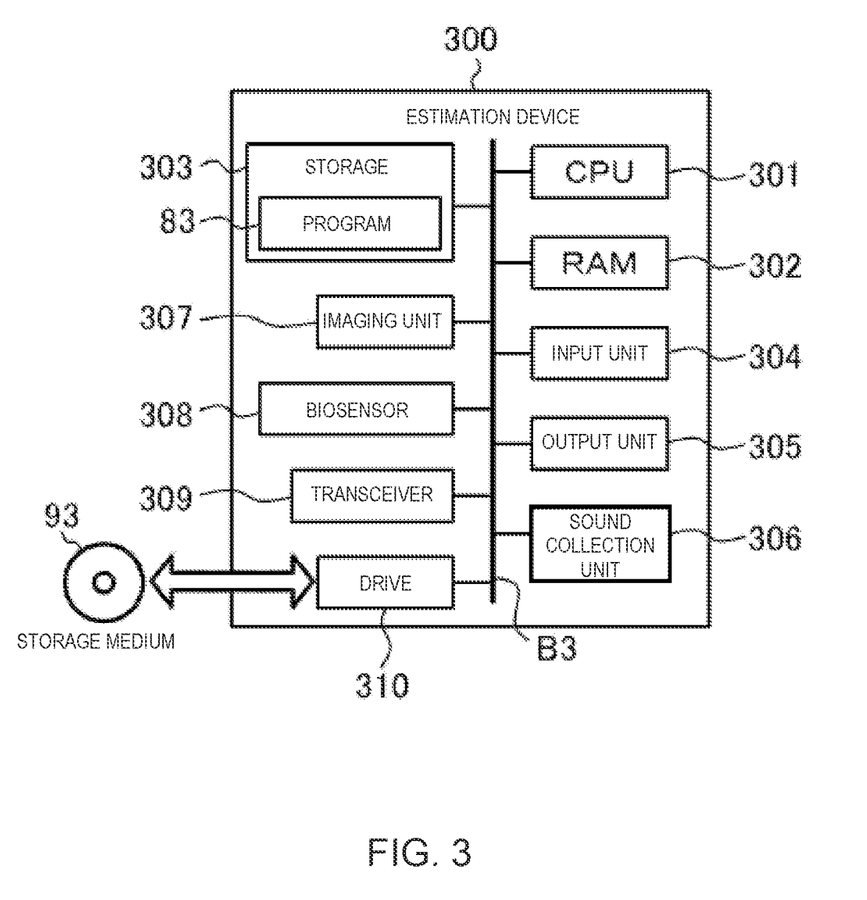
FIG. 3 shows one example of the hardware configuration of an estimation device according to the embodiment.

FIG. 3 shows an example of the hardware configuration of the estimation device 300 according to the embodiment. As shown in FIG. 3, the estimation device 300 is a computer in which a CPU 301, a RAM 302, a storage 303, an input unit 304, an output unit 305, a sound collection unit 306, an imaging unit 307, a biosensor 308, a transceiver 309, and a drive 310 are electrically connected via a bus B3.

The CPU 301 includes one or a plurality of processors for executing various computations in the estimation device 300. The CPU 301 is one example of a processor resource of the estimation device 300. The type of processor can be selected as deemed appropriate in accordance with the implementation. The estimation device 300 can be configured to comprise, instead of the CPU 301 or in addition to the CPU 301, an SPU (Sound Processing Unit), a DSP (Digital Signal Processor), an FPGA (Field Programmable Gate Array), an ASIC (Application Specific Integrated Circuit), etc. The RAM 302 is a volatile storage medium that operates as a working memory in which various types of information, such as the setting values used by the CPU 301, are stored and into which various programs are loaded. The storage 303 is a non-volatile storage medium that stores various programs and data used by the CPU 301. The RAM 302 and the storage 303 are examples of memory resources (computer memories) of the estimation device 300 that hold programs that are executed by the processor resource.

In the embodiment, the storage 303 stores various types of information, such as a program 83. The program 83 causes the estimation device 300 to execute information processing (FIG. 5, described further below) for training a degree of satisfaction estimation model, and information processing to estimate the degree of satisfaction using the trained satisfaction estimation model. The program 83 includes a series of instructions for the above-mentioned information processing.

The input unit 304, the imaging unit 307, the drive 310, and the storage medium 93 can be respectively configured in the same manner as the input unit 104, the imaging unit 107, the drive 109, and the storage medium 91 of the performance control device 100. The program 83 can be stored in the storage medium 93, and the estimation device 300 can read the program 83 from the storage medium 93.

The biosensor 308 is configured to acquire a time series of biological signals indicating biological information of the performer. The biological information of the performer can include one or a plurality of types of data, such as heart rate, perspiration volume, blood pressure, etc. The biosensor 308 can include one or more sensors, such as a pulse monitor, perspiration monitor, blood pressure monitor, etc.

The transceiver 309 is configured to transmit and receive data to and from other devices, by wire or wirelessly. In the embodiment, the estimation device 300 can be connected via the transceiver 309 to the performance control device 100 and the electronic instrument EM used when the performer plays the musical piece, to transmit and receive data. The transceiver 309 can include a plurality of modules, in the same manner as the transceiver 108.

The bus B3 is a signal transmission path that electrically interconnects the hardware components of the estimation device 300. With respect to the specific hardware configuration of the estimation device 300, components can be omitted, replaced, or supplemented as deemed appropriate in accordance with the implementation. For example, at least one or more of the input unit 304, the output unit 305, the sound collection unit 306, the imaging unit 307, the biosensor 308, the transceiver 309, or the drive 310 can be omitted.

3. Software Configuration Examples

Figure 4:
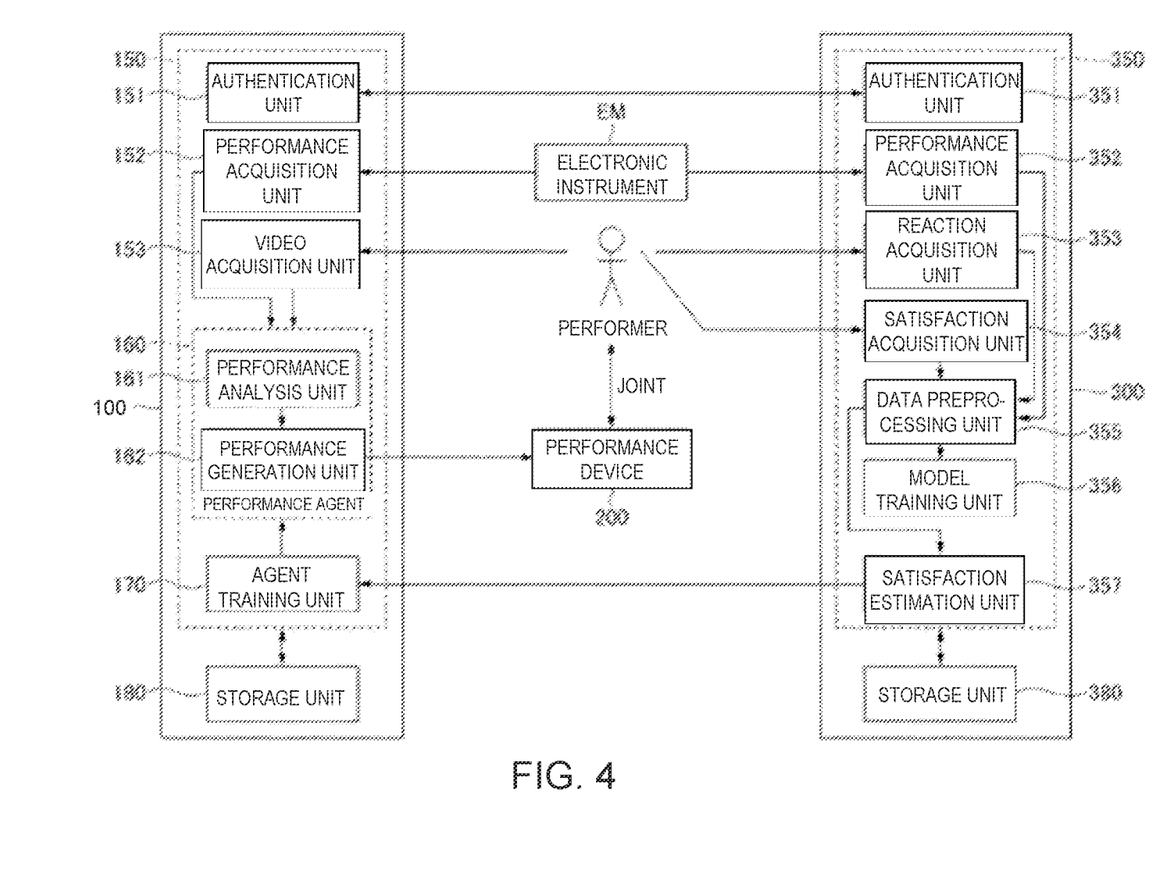
FIG. 4 shows an example of the software configuration of the automatic performance system according to the embodiment.

FIG. 4 shows an example of the software configuration of the automatic performance system S according to the embodiment.

(Performance Control Device

The performance control device 100 has a control unit 150 and a storage unit 180. The control unit 150 is configured to integrally control the operation of the performance control device 100 by the CPU 101 and the RAM 102. The storage unit 180 is configured to store various data used in the control unit 150, by the RAM 102 and the storage 103. The CPU 101 of the performance control device 100 loads the program 81 stored in the storage 103 into the RAM 102 and executes the instructions contained in the program 81 and loaded in the RAM 102. The performance control device 100 (control unit 150) thus operates as a computer that includes an authentication unit 151, a performance acquisition unit 152, a video acquisition unit 153, the performance agent 160, and an agent training unit 170 as software modules.

The authentication unit 151 is configured to cooperate with an external device, such as the estimation device 300, to authenticate the user (performer). In one example, the authentication unit 151 is configured to transmit to the estimation device 300 authentication data, such as a password and a user identifier input by the user using the input unit 104, and to permit or deny the user access based on the authentication result received from the estimation device 300. The external device that authenticates the user can be an authentication server other than the estimation device 300. The authentication unit 151 can be configured to supply the user identifier of the authenticated (access-granted) user to another software module.

The performance acquisition unit 152 is configured to observe the first performance of the musical piece by the performer and acquire performance data indicating the first performance (hereinafter also referred to as "first performance data"). The first performance data are, for example, time-stamped MIDI data sequences supplied from the electronic instrument EM. In one example, the performance acquisition unit 152 can be configured to acquire as the first performer data the performance sound indicated by electronic output signals from the sound collection unit 106 that collects the sounds of the first performance. The first performance data are data indicating the characteristics (for example, sound generation time and pitch) of sounds included in the performance and are a type of high-dimensional time series data which represent the first performance by the performer. The performance acquisition unit 152 is configured to supply the acquired first performance data to the performance agent 160. The performance acquisition unit 152 can be configured to transmit the acquired first performance data to the estimation device 300.

The video acquisition unit 153 is configured to acquire video data related to the first performance by the performer. In one example, the video acquisition unit 153 can be configured to acquire video data based on electronic signals representing images of the performer in the first performance captured by the imaging unit 107. The video data are motion data representing characteristics of the movements of the performer during the performance and are a type of high-dimensional time series data which represent the performance by the performer. Motion data are, for example, time series data of the skeleton of the performer. The video acquisition unit 153 is configured to supply the acquired video data to the performance agent 160. The video acquisition unit 153 can be configured to transmit the acquired video data to the estimation device 300.

The performance agent 160 is configured to cause the performance device 200 to execute an automatic performance which is a collaborative performance with the performer. The performance agent 160 can be configured to execute automatic performance control based on any method, such as the method disclosed in International Publication No. 2018/070286, the method disclosed in "Research on real-time score tracking by means of acoustic signals and active performance assistance system" (Shinji Sakou (Nagoya Institute of Technology), The Telecommunications Advancement Foundation "Research Grant Report" No. 31, 2016), etc. The automatic performance (second performance) can be, for example, an accompaniment to, or a countermelody of, the first performance.

The performance agent 160 includes an arithmetic model that has a plurality of parameters that determine actions (such as "increase the tempo by 1," "decrease the tempo by 1," "decrease the tempo by 10," . . . , "increase the volume by 3," "increase the volume by 1," "decrease the volume by 1" and the like) that are executed in accordance with the state at that time (for example, "the difference in volume between the two (performer and performance agent)," "the volume of the performance agent," "the tempo of the performance agent," "the time difference between the two," and the like), for example. The performance agent 160 can be appropriately configured to determine actions in accordance with the state at that time based on the plurality of parameters and change the performance being performed at that time, in accordance with the determined actions. In this embodiment, the performance agent 160 is configured to include a performance analysis unit 161 and a performance generation unit 162 according to the arithmetic model. A non-limiting and a schematic automatic performance control will be illustrated below.

The performance analysis unit 161 is configured to estimate a performance position, which is the position on the musical piece that the performer is currently performing, based on the first performance data and the video data supplied from the performance acquisition unit 152 and the video acquisition unit 153. The estimation of the performance position by the performance analysis unit 161 can be executed continuously (for example, periodically) in parallel with the performance by the performer.

In one example, the performance analysis unit 161 can be configured to estimate the performance position of the performer by cross-comparing the series of notes indicated by the first performance data and the series of notes indicated by the music data for the automatic performance. The music data include reference data corresponding to the first performance by the performer (performance part) and automatic performance data indicating the second performance (automatic performance part) by the performance agent 160. Any music analysis technique (score alignment technique) can be appropriately employed for the estimation of the performance position by the performance analysis unit 161.

The performance generation unit 162 is configured to automatically generate performance data of the second performance (hereinafter also referred to as "second performance data") based on the automatic performance data in the music data so as to be synchronized with the progression of the performance position (movement on a time axis) estimated by the performance analysis unit 161, and to supply the generated second performance data to the performance device 200. The automatically generated second performance data are data for the second performance, which is performed in parallel with the first performance, and are instruction data for operating the drive mechanism of the performance device 200 in accordance with the series of notes. That is, the performance generation unit 162 is configured to operate as a sequencer that supplies, to the performance device 200, the second performance data (for example, a time-stamped MIDI data sequence) that realize the musical piece corresponding to the music data. The performance generation unit 162 can be configured also to supply the second performance data to the estimation device 300. The performance device 200 is configured to perform the second performance, which is an automatic performance of a musical piece, in accordance with the second performance data supplied from the performance generation unit 162.

The configuration of the performance agent 160 (the performance analysis unit 161 and the performance generation unit 162) is not limited to such an example. In another example, the performance agent 160 (the performance analysis unit 161 and the performance generation unit 162) can be configured to generate the second performance data in an improvised manner based on the first performance data that indicate the first performance of the performer instead of being based on existing music data, and supply the generated second performance data to the performance device 200 to cause the performance device 200 to execute the automatic performance (improvised performance).

The agent training unit 170 is configured to train the performance agent 160 so as to maximize the performer's degree of satisfaction with the second performance. The operation of the agent training unit 170 will be described in detail further below. The performer's degree of satisfaction with the second performance can be acquired by any method. In the embodiment, the acquisition of the degree of satisfaction can include acquiring performer information related to the first performance of the performer, and acquiring the degree of satisfaction from the acquired performer information. Further, the acquisition of the degree of satisfaction from the performer information can include estimating the degree of satisfaction from the performer information by using a trained estimation model (satisfaction estimation model) generated by machine learning described further below. The performer information can be configured to include video of the first performance by the performer. The performer information can be configured to include one or more facial expression(s) and/or one or more postures of the performer extracted from the video. The performer information can be configured to include one or more biological signals of the performer acquired at the time of the first performance of the performer. The above-mentioned "at the time of the first performance" can include the period of time after the end of the first performance during which the sounds of the performance linger, as well as the time period of the first performance itself. The performer information can be configured to include the performance data of the first performance by the performer.

(Estimation Device

The estimation device 300 has a control unit 350 and a storage unit 380. The control unit 350 is configured to integrally control the operation of the estimation device 300 by the CPU 301 and the RAM 302. The storage unit 380 is configured to store various data (specifically, the satisfaction estimation model described further below) used in the control unit 350 by the RAM 302 and the storage 303. The CPU 301 of the estimation device 300 loads the program 83 stored in the storage 303 into the RAM 302 and executes the instructions contained in the program 83 and loaded in the RAM 302. The estimation device 300 (control unit 350) thus operates as a computer that is equipped with software modules implementing an authentication unit 351, a performance acquisition unit 352, a reaction acquisition unit 353, a satisfaction acquisition unit 354, a data preprocessing unit 355, a model training unit 356, and a satisfaction estimation unit 357.

The authentication unit 351 is configured to cooperate with the performance control device 100 in order to authenticate the user (performer). In one example, the authentication unit 351 determines whether authentication data provided by the performance control device 100 match the authentication data stored in the storage unit 380 and transmits the authentication result (permission or denial) to the performance control device 100.

The performance acquisition unit 352 is configured to acquire the first performance data (performer information) by the performer. The first performance data are a sequence of notes, and data defining the note-generation timing, duration, pitch, and intensity of each note. In one example, the performance acquisition unit 352 can be configured to acquire the performance data that indicate the first performance supplied from the electronic instrument EM, directly from the electronic instrument EM or via the performance control device 100. In another example, the performance acquisition unit 352 can be configured to acquire performance sound representing the first performance using the sound collection unit 306 or the performance control device 100. The performance acquisition unit 352 is configured to store the acquired first performance data in the storage unit 380. The performance acquisition unit 352 can be configured to associate a user identifier of the performer authenticated by the authentication unit 351 with the acquired first performance data.

The reaction acquisition unit 353 is configured to acquire reaction data (performer information) that indicate the reactions of the performer performing the first performance. In one example, the reaction acquisition unit 353 can be configured to acquire video as the reaction data that show the reactions of the performer performing the first performance captured by the imaging unit 307. The reaction acquisition unit 353 can acquire the facial expressions and/or postures of the performer extracted from the acquired video as the reaction data. Further, the reaction acquisition unit 353 can acquire biological signals of the performer acquired by the biosensor 308 at the time of the first performance of the performer as the reaction data. The biological signals can include one or a plurality of types of data, such as the heart rate, perspiration volume, blood pressure, etc.

The satisfaction acquisition unit 354 is configured to acquire a satisfaction label (correct answer label) indicating the performer's personal degree of satisfaction with the collaborative performance with the performance agent 160 (performance device 200). The satisfaction label is data indicating the performer's degree of satisfaction with the second performance performed by the performance agent 160 (or any method of simulating the performance agent 160). The degree of satisfaction can be expressed using discrete values representing a stepwise evaluation, or using continuous values. The performer can input a satisfaction label via an input device, such as the input unit 104 of the performance control device 100 or the input unit 304 of the estimation device 300. In the case that information on the satisfaction label is input to the performance control device 100, the satisfaction label can be transferred to the estimation device 300 by the control unit 150 (CPU 101), and the satisfaction acquisition unit 354 can be configured to receive the satisfaction label that is transferred from the performance control device 100. The satisfaction acquisition unit 354 is configured to store the acquired satisfaction label in the storage unit 380 in association with the performer information relating to the first performance (first performance data, reaction data).

The data preprocessing unit 355 is configured to preprocess data (performer information, etc.) that are input to the estimation model (hereinafter also referred to as "satisfaction estimation model") for estimating the performer's degree of satisfaction, so that the data will be in a form suitable for the computation of the estimation model. The data preprocessing unit 355 is configured to supply the preprocessed data to the model training unit 356 during the training stage and to supply the preprocessed data to the satisfaction estimation unit 357 during the estimation stage.

The model training unit 356 is configured to use the performer information and the satisfaction label supplied from the data preprocessing unit 355 as input data (training data) and teacher signals (correct answer data), respectively, to train the satisfaction estimation model by machine learning. The satisfaction estimation model can be any machine learning model having a plurality of parameters. For example, a feedforward neural network (FFNN) including multilayer perceptrons, a Hidden Markov model (HMM), or the like, can be used as the machine learning model constituting the satisfaction estimation model. In addition, for example, a recurrent neural network (RNN) adapted to time-series data, derivative configurations thereof (long short-term memory (LSTM), gated recurrent unit (GRU), etc.), a convolutional neural network (CNN), or the like, can be used as the machine learning model constituting the satisfaction estimation model. The machine learning is configured by training the satisfaction estimation model such that the degree of satisfaction estimated by the satisfaction estimation model from the performer information for training matches the true value indicated by the satisfaction label. The method of machine learning can be appropriately selected in accordance with the type of machine learning model to be employed. The trained satisfaction estimation model generated by machine learning can be appropriately saved in a storage area of the storage unit 380, or the like, in the form of learning result data.

The satisfaction estimation model 357 includes the trained satisfaction estimation model generated by the model training unit 356. The satisfaction estimation unit 357 is configured to use the trained satisfaction estimation model to estimate the performer's degree of satisfaction from the performer information obtained at the time of inference. Specifically, the satisfaction estimation unit 357 inputs as input data the preprocessed performer information supplied from the data preprocessing unit 355 to the trained satisfaction estimation model to execute the computational processing of the trained satisfaction estimation model. By this computational processing, the satisfaction estimation unit 357 acquires from the trained satisfaction estimation model an output corresponding to the result of estimating the performer's degree of satisfaction from the input performer information. The estimated degree of satisfaction (estimation result of the degree of satisfaction) is supplied to the agent training unit 170 of the performance control device 100.

(Other)

In the embodiment, an example in which each software module of the performance control device 100 and the estimation device 300 is realized by a general-purpose CPU is described. However, some or all of the software modules can be realized by one or more dedicated processors. Each of the modules described above can also be realized as a hardware module. Further, with respect to the respective software configuration of the performance control device 100 and the estimation device 300, the software modules can be omitted, replaced, or supplemented as deemed appropriate in accordance with the implementation.

4. Operation Example (Training Process of Satisfaction Estimation Model)

Figure 5:
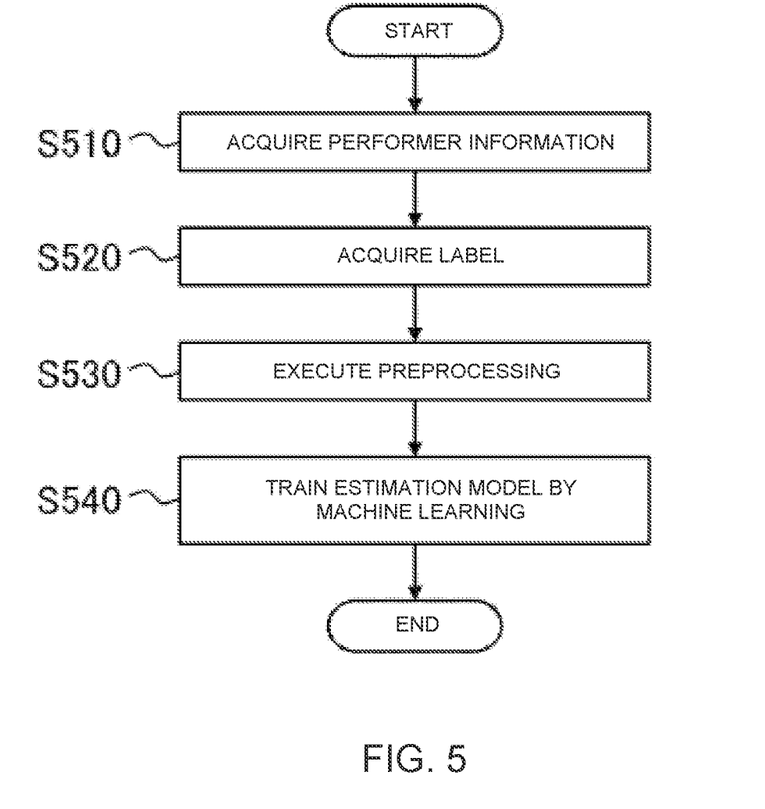
FIG. 5 is a flowchart showing an example of the training process of an estimation model for estimating a degree of satisfaction in the embodiment.

FIG. 5 is a flowchart showing one example of a training process of the satisfaction estimation model carried out by the automatic performance system S according to the embodiment. The processing procedure described below is merely an example, and each step thereof can be changed to the extent possible. With respect to the following processing procedure, the steps can be omitted, replaced, or supplemented as deemed appropriate in accordance with the implementation.

In Step S510, the CPU 301 of the estimation device 300 acquires the performer information relating to the first performance of the performer. In the embodiment, the performer information can be configured to include at least one or more of the first performance data that indicates the first performance by the performer, biological signals of the performer acquired at the time of the first performance by the performer, video of the performer performing the first performance, or facial expressions and postures of the performer extracted from the video. In the case that the performer information is configured to include the first performance data, the CPU 301 operates as the performance acquisition unit 352 and acquires the first performance data that indicate the first performance by the performer. In the case that the performer information is configured to include at least one of or more the biological signals of the performer acquired at the time of the first performance by the performer, the video of the performer performing the first performance, or the facial expressions and postures of the performer extracted from the video, the CPU 301 operates as the reaction acquisition unit 353 and acquires the reaction data indicating the reactions of the performer performing the first performance. The CPU 301 stores the acquired performer information in the storage unit 380. When the performer information for training the satisfaction estimation model is acquired, the second performance can be performed in parallel with the first performance by any method (a method using the performance agent 160, or another method).

In Step S520, the CPU 301 operates as the satisfaction acquisition unit 354 and acquires the satisfaction label indicating the performer's degree of satisfaction with the second performance. In one example, the CPU 301 can acquire the satisfaction label by the performer's input via an input device. The CPU 301 stores the acquired satisfaction label in the storage unit 380 in association with the performer information.

The processes of Step S510 and S520 can be executed in parallel or sequentially.

In Step S530, the CPU 301 operates as the data preprocessing unit 355, carries out data preprocessing of the performer information stored in the storage unit 380, and supplies the preprocessed performer information to the model training unit 356.

In Step S540, the CPU 301 operates as the model training unit 356 and uses the preprocessed performer information and satisfaction label as the input data (training data) and the teacher signals (correct answer data), respectively, to execute the machine learning of the satisfaction estimation model. That is, the CPU 301 trains the satisfaction estimation model such that the degree of satisfaction estimated by the satisfaction estimation model from the performer information for training matches the true value indicated by the satisfaction label.

By this machine learning, a trained satisfaction estimation model which has attained the ability to estimate the performer's degree of satisfaction from the performer information is generated. The CPU 301 generates the learning result data indicating the trained satisfaction estimation model and stores the generated learning result data in a storage area of the storage unit 380, or the like. If this machine learning is additional learning or relearning, the CPU 301 updates the learning result data stored in the storage area of the storage unit 380, or the like, by the newly generated learning result data.

The training process of the satisfaction estimation model according to the present operation example is thus concluded. The training process described above can be periodically executed, or executed in accordance with a request from the user (performance control device 100). The CPU 101 of the performance control device 100 and the CPU 301 of the estimation device 300 can each operate as an authentication unit (151, 351) to authenticate the performer before executing the process of Step S510. The performer information of the authenticated performer and the satisfaction label can be collected to generate the trained satisfaction estimation model.

(Training Process of Performance Agent)

Figure 6:
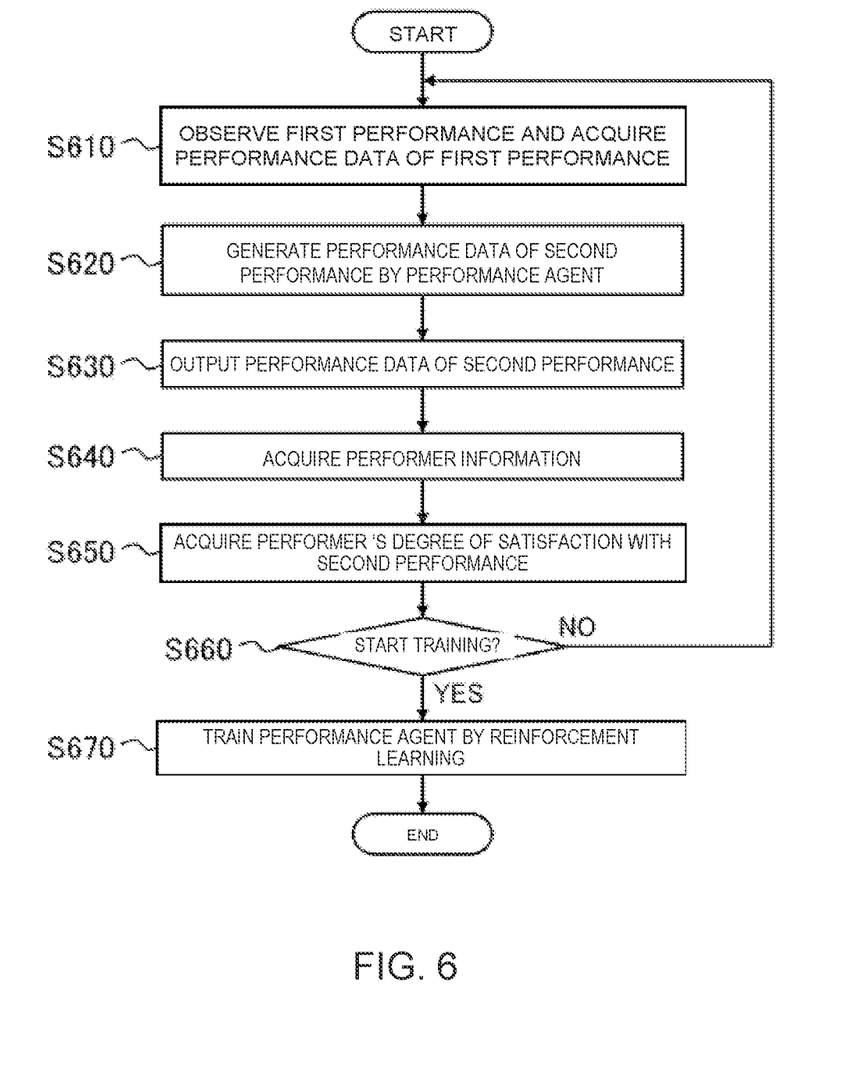
FIG. 6 is a flowchart showing an example of the training process of a performance agent in the embodiment.

FIG. 6 is a flowchart showing one example of the training process of the performance agent 160 carried out by the automatic performance system S according to the embodiment. The following processing procedure is one example of the performance agent training method. However, the processing procedure described below is merely an example, and each step of the process can be changed to the extent possible. With respect to the following processing procedure, the steps can be omitted, replaced, or supplemented as deemed appropriate in accordance with the implementation.

In Step S610, the CPU 101 of the performance control device 100 and/or the CPU 301 of the estimation device 300 observes the first performance of the musical piece by the performer and acquires the first control data representing the first performance. The CPU 101 can operate as the performance acquisition unit 152 and acquire the first performance data. Alternatively, the CPU 301 can operate as the performance acquisition unit 352 and acquire the first performance data. The acquired first performance data can be stored in the storage unit 180 and/or the storage unit 380.

In Step S620, the CPU 101 generates the second performance data representing the second performance to be performed in parallel with the observed first performance by the performance agent 160. The CPU 101 operates as the performance analysis unit 161 and the performance generation unit 162 and executes the computational processing of the arithmetic model constituting the performance agent to estimate the performance position of the performer and generate the second performance data so as to be synchronized with the estimated performance position.

In Step S630, the CPU 101 operates as the performance generation unit 162 and outputs the second performance data so as to perform the second performance in parallel with the first performance of the performer. In one example, the CPU 101 supplies the generated second performance data to the performance device 200 and controls the operation of the performance device 200 to execute automatic performance in accordance with the second performance data.

In Step S640, the CPU 101 of the performance control device 100 and/or the CPU 301 of the estimation device 300 acquires the performer information relating to the first performance of the performer. In the case that the performer information is configured to include the first performance data, the process of Step S640 can be executed in common with Step S610. In the case that the performer information is configured to include at least one or more of the biological signals of the performer acquired at the time of the first performance by the performer, the video of the performer performing the first performance, or the facial expressions and postures of the performer extracted from the video, the CPU 301 can operate as the reaction acquisition unit 353 and acquire the reaction data indicating the reactions of the performer performing the first performance. Alternatively, the CPU 101 can operate as the video acquisition unit 153 and acquire video of the performer performing the first performance and/or the facial expressions and postures of the performer extracted from the video. The acquired performer information can be stored in the storage unit 180 and/or the storage unit 380.

In Step S650, the acquired performer information is supplied to the data preprocessing unit 355. The CPU 301 of the estimation device 300 operates as the data preprocessing unit 355, carries out data preprocessing of the performer information, and supplies the preprocessed performer information to the satisfaction estimation unit 357. The CPU 301 then operates as the satisfaction estimation unit 357 and uses the trained estimation model to estimate, from the acquired performer information, the performer's degree of satisfaction of with the second performance based on the output second performance data. The estimated degree of satisfaction is supplied from the satisfaction estimation unit 357 to the agent training unit 170 of the performance control device 100.

In Step S660, the CPU 101 of the performance control device 100 determines whether to start the training of the performance agent 160. For example, the CPU 101 can determine to start the training of the performance agent 160 at any time, such as when the data used for the reinforcement learning have been collected, when the first performance by the performer has ended, etc. When it is determined that the training is to be started, the CPU 101 advances process control to Step S670. On the other hand, if it is determined that the training is not to be started, the CPU 101 returns process control to Step S610, the series of processes from Steps S610 to S650 are repeatedly executed, and the collection of learning data to be used for the training of the performance agent 160 is continued.

The processes of Steps S610-S650 can be sequentially executed in the collaborative performance of the performer and the performance agent 160, and, as a result, the performer's degree of satisfaction can be estimated in a time-sequential manner. The degree of satisfaction can be estimated per unit time, or be estimated per any unit of the performance (such as a phrase). The processes of Steps S610-S650 can be executed in real time in parallel with the first performance of the performer, or be executed after the fact with respect to the first performance stored in the storage unit 180 and/or the storage unit 380.

In Step S670, the CPU 101 operates as the agent training unit 170 and uses the learning data collected by the processes up to Step S660 to execute machine learning of the performance agent 160.

Figure 7:
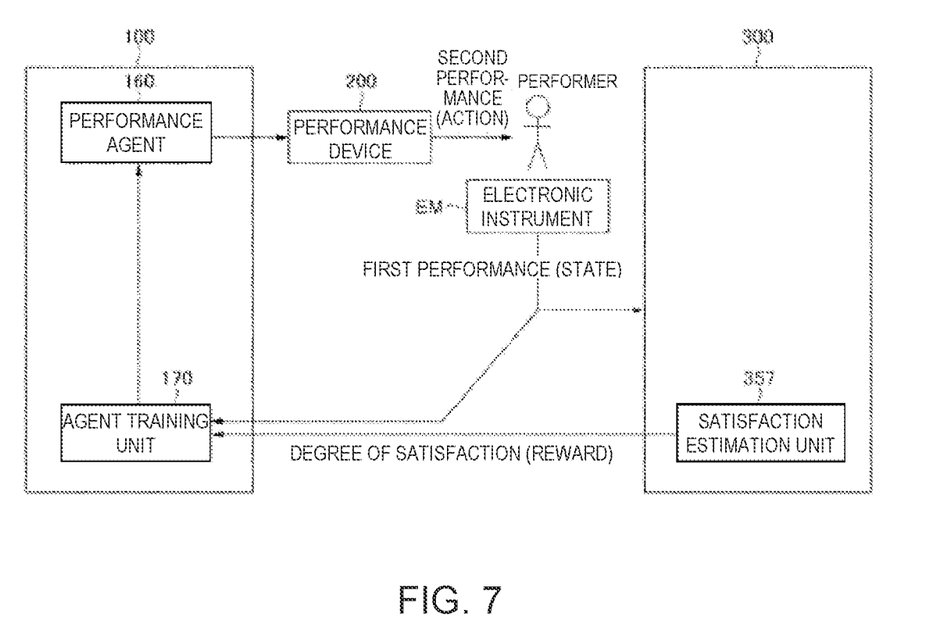
FIG. 7 shows an example of the reinforcement learning process of a performance agent in the embodiment.

FIG. 7 shows one example of the training (machine learning) process of the performance agent 160 carried out by the automatic performance system S according to this embodiment. In this embodiment, the CPU 101 uses the performer's degree of satisfaction with the second performance as a reward to execute the reinforcement learning of the performance agent 160.

In the reinforcement learning according to the embodiment, as shown in FIG. 7, the first performance by the performer corresponds to the observed "state," the performer's degree of satisfaction estimated by the satisfaction estimation unit 357 corresponds to the "reward," and the second performance by the performance agent 160 and the performance device 200 corresponds to the "action." The first performance by the performer, which is the "state," changes, and the performer's degree of satisfaction, which is the "reward," is estimated, in accordance with the second performance which is the "action" by the performance agent 160 and the performance device 200. The first performance, the second performance, and the degree of satisfaction are all time-series data. The "state" can include other information relating to the performance (such as music data and reaction data).

The CPU 101 uses the acquired degree of satisfaction as the reward to train the performance agent 160 so as to maximize the performer's degree of satisfaction with the second performance by reinforcement learning. More specifically, the CPU 101 trains the performance agent 160 to automatically generate the second training data that maximize the sum of the degrees of satisfaction acquired in the future (that is, the "revenue"). In this training process, the value of each parameter constituting the performance agent 160 is gradually changed to increase the reward that is obtained. In one example, the performance agent 160 can be configured to include a value function (for example, an action value function), and a method such as Q-learning, or the Monte Carlo method can be employed as the method of reinforcement learning. In another example, the performance agent 160 can be configured to include a policy function, and a method such as the policy gradient method can be employed as the method of reinforcement learning. The method of reinforcement learning and the configuration of the performance agent 160 can be appropriately selected in accordance with the implementation.

The training process of the performance agent 160 according to the present operation example is thus concluded. The training process described above can be executed at any time. As in the machine learning of the satisfaction estimation model described above, the CPU 101 of the performance control device 100 and the CPU 301 of the estimation device 300 can each operate as an authentication unit (151, 351) to authenticate the performer before executing the process of Step S610. The automatic performance system S can thereby collect learning data of the authenticated performer and use the collected learning data to execute the training of the performance agent 160. Further, the automatic performance system S can execute the processes of Steps S610-S630 without training the performance agent 160 (that is, omitting the processes after Step S640) to carry out the automatic performance by the performance agent 160.

(Features)

By the embodiment, it is possible to automatically generate a performance agent 160 that is compatible with the performer. As a result, it is possible to achieve a reduction in the cost of generating the performance agent 160 that is compatible with the performer. Further, in the embodiment, it is possible to use the performer information to automatically acquire the performer's degree of satisfaction. It is thus possible to reduce the time and effort required for acquiring the degree of satisfaction. Further, in the embodiment, it is possible to use the trained satisfaction estimation model generated by machine learning for the suitable acquisition of the degree of satisfaction. Further, in the embodiment, the performer information can be configured to include at least one or more of the first performance data indicating the first performance by the performer, biological signals of the performer acquired at the time of the first performance by the performer, video of the performer performing the first performance, or facial expressions and postures of the performer extracted from the video. It is thereby possible to accurately estimate the degree of satisfaction.

5. Modification

An embodiment of this disclosure has been described above in detail, but the above-mentioned description is merely an example of this disclosure in all respects. Needless to say, various refinements and modifications can be made without deviating from the scope of this disclosure. For example, the following alterations can be made. The following modified examples can be combined as deemed appropriate.

In the embodiment, the automatic performance system S is equipped with the performance control device 100, the performance device 200, the estimation device 300, and the electronic instrument EM as separate devices. However, one or a plurality of these devices can be integrally configured. In another example, the performance control device 100 and the performance device 200 can be integrally configured. Alternatively, the performance control device 100 and the estimation device 300 can be integrally configured. When, for example, the performance control device 100 and the estimation device 300 are integrally configured, the CPU 101 and the CPU 301 can be integrally configured as a single processor resource, the storage unit 180 and the storage unit 380 can be integrally configured as a single memory resource, and the program 81 and the program 83 can be stored as a single program.

In the embodiment, the performance device 200 can be omitted. In this case, the automatic performance system S can be configured to supply the second performance data to an external performance device by the performance control device 100 to realize the automatic performance of the second performance.

In the embodiment, a trained satisfaction estimation model generated by machine learning is used for the acquisition of the degree of satisfaction. However, the method for acquiring the degree of satisfaction is not limited to such an example. The degree of satisfaction can be acquired from the performer information by another method. Alternatively, the degree of satisfaction can be acquired independently of the performer information. The performer's degree of satisfaction used for the training of the performance agent 160 can be acquired by any method. As another example, the degree of satisfaction can be calculated from the performer information by a prescribed algorithm. As another example, the degree of satisfaction can be directly input by the performer by an input device, such as the input unit 104 of the performance control device 100 or the input unit 304 of the estimation device 300.

Further, the method of reinforcement learning is not limited to the method described above. In another example, a Gaussian process regression (Bayesian optimization) model can be used for the arithmetic model of the performance agent 160. Further, a genetic algorithm, which is a method that imitates the process of biological evolution, can be employed as the method of machine learning.

Each of the above-described storage media (91, 93) can be a computer-readable non-transitory recording medium. Further, the programs (81, 83) can be supplied via a transmission medium, or the like. In the case that the programs are transmitted via a communication network, such as the Internet or telephone lines, the "computer-readable non-transitory recording medium" can include storage media that retain programs for a set period of time, such as volatile memory (for example, DRAM (Dynamic Random Access Memory)) inside a computer system that constitutes a server, a client, etc.

APPENDIX

A performance agent training method realized by a computer, comprising
  observing a first performance of a musical piece by a performer,
  generating performance data of a second performance to be performed using a performance agent in parallel with the observed first performance,
  supplying the performance data to a playback device (for example, an electronic instrument, a piano player, etc.) and causing the playback device to play the second performance in parallel with the first performance,
  observing the performer's degree of satisfaction with the reproduced second performance, and
  adjusting parameters to be followed by the performance agent when the performance data is generated, so that the obtained degree of satisfaction is maximized, by reinforcement learning using the degree of satisfaction as a reward.

By this disclosure, it is possible to achieve a reduction in the cost of generating a performance agent compatible with a performer.

What is claimed is:

1. A performance agent training method realized by at least one computer, the performance agent training method comprising:

observing a first performance of a musical piece by a performer to acquire performance data of the first performance, the performance data of the first performance being
    data that include a sequence of notes, define a note-generation timing, duration, pitch and intensity of each note, and have been converted from an instrument play signal from an electronic musical instrument performed by the performer or converted from a signal based on a sound from a non-electronic instrument performed by the performer or the performer's voice, or
    data that include electronic output signals indicating performance sound of the first performance;
generating, by a performance agent, performance data of a second performance that is an unmanned performance to be performed in parallel with the first performance;
outputting the performance data of the second performance such that the second performance is performed in parallel with the first performance of the performer;
acquiring a signal indicative of a degree of satisfaction of the performer with respect to the second performance performed based on the performance data of the second performance that have been output; and
training the performance agent by reinforcement learning, using the degree of satisfaction as a reward in the reinforcement learning and the first performance as a state in the reinforcement learning, such that the degree of satisfaction of the performer respect to the second performance is maximized.

2. The performance agent training method according to claim 1, wherein
    the degree of satisfaction is acquired from performer information relating to the first performance of the performer.

3. The performance agent training method according to claim 2, wherein
    the degree of satisfaction is estimated from the performer information, using a trained estimation model generated by machine learning.

4. The performance agent training method according to claim 2, wherein
    the performer information includes video of the performer performing the first performance.

5. The performance agent training method according to claim 4, wherein
    the performer information includes at least one of a facial expression of the performer extracted from the video or a posture of the performer extracted from the video, or both.

6. The performance agent training method according to claim 2, wherein
    the performer information includes a biological signal of the performer acquired at a time of the first performance of the performer.

7. The performance agent training method according to claim 2, wherein
    the performer information includes performance data of the first performance by the performer.

8. The performance agent training method according to claim 1, wherein
    the training of the performance agent is performed such that a sum of degrees of satisfaction indicated by signals acquired in a future with respect to the second performance is maximized.

9. An automatic performance system comprising:
    at least one processor resource that includes a performance agent; and
    at least one memory resource that holds at least one program that is executed by the at least one processor resource,
    the at least one processor resource being configured to, by executing the at least one program,
        observe a first performance of a musical piece by a performer to acquire performance data of the first performance, the performance data of the first performance being
            data that include a sequence of notes, define a note-generation timing, duration, pitch and intensity of each note, and have been converted from an instrument play signal from an electronic musical instrument performed by the performer or converted from a signal based on a sound from a non-electronic instrument performed by the performer or the performer's voice, or
            data that include electronic output signals indicating performance sound of the first performance,
        generate, at the performance agent, performance data of a second performance that is an unmanned performance to be performed in parallel with the first performance,
        output the performance data of the second performance such that the second performance is performed in parallel with the first performance of the performer,
        acquire a signal indicative of a degree of satisfaction of the performer with respect to the second performance performed based on the performance data of the second performance that have been output, and
        train the performance agent by reinforcement learning, using the degree of satisfaction as a reward in the reinforcement learning and the first performance as a state in the reinforcement learning, such that the degree of satisfaction of the performer respect to the second performance is maximized.

10. The automatic performance system according to claim 9, further comprising
    a performance instrument configured to perform the second performance in accordance with the performance data of the second performance.

11. The automatic performance system according to claim 9, wherein
    the at least one processor resource is configured to acquire performer information relating to the first performance of the performer and acquire the degree of satisfaction from the performer information.

12. The automatic performance system according to claim 11, wherein
    the at least one processor resource is configured to estimate the degree of satisfaction from the performer information, using a trained estimation model generated by machine learning, to acquire the degree of satisfaction.

13. The automatic performance system according to claim 11, wherein
    the performer information includes video of the performer performing the first performance.

14. The automatic performance system according to claim 13, wherein
    the performer information includes at least one of a facial expression of the performer extracted from the video or a posture of the performer extracted from the video, or both.

15. The automatic performance system according to claim 11, wherein
the performer information includes a biological signal of the performer acquired at a time of the first performance of the performer.

16. The automatic performance system according to claim 11, wherein
the performer information includes performance data of the first performance by the performer.

17. The automatic performance system according to claim 9, wherein
the at least one processor resource is configured to train the performance agent such that a sum of degrees of satisfaction indicated by signals acquired in a future with respect to the second performance is maximized.

18. A non-transitory computer-readable medium storing at least one program that causes at least one computer to execute a process, the process comprising:
observing a first performance of a musical piece by a performer to acquire performance data of the first performance, the performance data of the first performance being
data that include a sequence of notes, define a note-generation timing, duration, pitch and intensity of each note, and have been converted from an instrument play signal from an electronic musical instrument performed by the performer or converted from a signal based on a sound from a non-electronic instrument performed by the performer or the performer's voice, or
data that include electronic output signals indicating performance sound of the first performance;
generating, by a performance agent, performance data of a second performance that is an unmanned performance to be performed in parallel with the first performance;
outputting the performance data of the second performance such that the second performance is performed in parallel with the first performance of the performer;
acquiring a signal indicative of a degree of satisfaction of the performer with respect to the second performance performed based on the performance data of the second performance that have been output; and
training the performance agent by reinforcement learning, using the degree of satisfaction as a reward in the reinforcement learning and the first performance as a state in the reinforcement learning, such that the degree of satisfaction of the performer respect to the second performance is maximized.

19. The non-transitory computer-readable medium according to claim 18, wherein
the training of the performance agent is performed such that a sum of degrees of satisfaction indicative of signals acquired in a future with respect to the second performance is maximized.

* * * * *